(12) United States Patent
Knowles et al.

(10) Patent No.: US 7,083,537 B2
(45) Date of Patent: Aug. 1, 2006

(54) MULTIPLE SPEED AUTOMATIC TRANSMISSION FOR MOTOR VEHICLE

(75) Inventors: Shaun Knowles, Canton, MI (US);
Jeffrey Maurer, Commerce, MI (US);
Steven Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 10/738,531

(22) Filed: Dec. 18, 2003

(65) Prior Publication Data

US 2005/0137044 A1 Jun. 23, 2005

(51) Int. Cl.
*F16H 31/00* (2006.01)

(52) U.S. Cl. ............... 475/116; 475/146; 192/48.8; 192/87.11

(58) Field of Classification Search .......... 475/116, 475/146; 192/48.8, 87.11, 87.12, 87.13
See application file for complete search history.

(56) References Cited

U.S. PATENT DOCUMENTS

| | | | | |
|---|---|---|---|---|
| 3,710,650 A | * | 1/1973 | Piret | 475/148 |
| 3,741,037 A | * | 6/1973 | Piret | 475/148 |
| 3,741,038 A | * | 6/1973 | Piret | 475/148 |
| 3,747,727 A | * | 7/1973 | Dach et al. | 192/18 A |
| 3,776,066 A | * | 12/1973 | Piret | 475/148 |
| 3,916,727 A | * | 11/1975 | Piret | 475/71 |
| 4,082,171 A | * | 4/1978 | Lalin et al. | 192/70.2 |
| 4,331,044 A | * | 5/1982 | Bookout et al. | 475/56 |
| 4,400,998 A | * | 8/1983 | Bookout et al. | 475/71 |
| 4,747,323 A | * | 5/1988 | Kiuchi et al. | 475/59 |
| 5,106,352 A | | 4/1992 | Lepelletier | |
| 6,110,069 A | | 8/2000 | Taniguchi et al. | |
| 6,120,410 A | | 9/2000 | Taniguchi et al. | |
| 6,135,912 A | | 10/2000 | Tsukamoto et al. | |
| 6,139,463 A | | 10/2000 | Kasuya et al. | |
| 6,960,150 B1 | * | 11/2005 | Armstrong et al. | 475/276 |

FOREIGN PATENT DOCUMENTS

| | | |
|---|---|---|
| DE | 2127827 | 2/1972 |
| DE | 19702198 | 7/1998 |
| JP | 63270948 A * | 11/1988 |

* cited by examiner

*Primary Examiner*—Charles A. Marmor
*Assistant Examiner*—David D. Le
(74) *Attorney, Agent, or Firm*—David B. Kelley; MacMillan, Sobanski & Todd (57) ABSTRACT

A multiple speed transmission for a motor vehicle includes a speed reduction gear set driveably connected to an input shaft, a planetary gear set having elements selectively driveably connected to the speed reduction gear set and input shaft, a first clutch and a second clutch, each clutch connected through the speed reduction gear set to the input shaft, a source of hydraulic fluid, and a first servo having a first fluid path connecting the fluid source and the first clutch, and a second fluid path connecting the fluid source and the second clutch, and a third fluid path connecting the lubrication fluid source and the lubrication circuit.

3 Claims, 5 Drawing Sheets

| RANGE | C-1 | C-2 | C-3 | B-1 | B-2 | F-1 |
|---|---|---|---|---|---|---|
| REV |  |  | X |  | X |  |
| N |  |  |  |  |  |  |
| 1ST | X |  |  |  | CB | X |
| 2ND | X |  |  | X |  | O/R |
| 3RD | X |  | X |  |  | O/R |
| 4TH | X | X |  |  |  | O/R |
| 5TH |  | X | X |  |  | O/R |
| 6TH |  | X |  | X |  | O/R |

MULTIPLE SPEED AUTOMATIC TRANSMISSION FOR MOTOR VEHICLE

BACKGROUND OF THE INVENTION

1. Field of the Invention

This invention relates to the field of step-change automatic transmissions for motor vehicles, particularly to such transmissions whose principal axis is arranged transversely in a vehicle.

2. Description of the Prior Art

Various kinematic arrangements that minimize the number of friction clutches and brakes in a multiple-speed automatic transmissions able to produce six or more forward speed ratios are known. For example, U.S. Pat. No. 5,106,352 describes a gear arrangement wherein a first planetary gear set produces an output speed that is reduced relative to the speed of an input shaft. This output is selectively driveably connected to a planetary gear set of the Ravigneaux type, which is also selectively driveable connectable to the input shaft. This arrangement results in six forward speeds using three clutches and two brakes, a compact design suitable for transversely directed transmissions for use in front wheel drive vehicles.

U.S. Pat. Nos. 6,110,069 and 6,120,410 describe various techniques for reducing the axial length of such transmissions so that they package in a confined space limited by the size of the engine compartment. U.S. Pat. No. 6,135,912 describes a gear train in which seal rings are arranged in a hydraulic path for applying hydraulic pressure to the clutches and brakes and for sealing at a position where members rotate. Relatively large sliding resistance occurs between members that rotate relative to each other. If the number of seal rings increases, the rotational resistance of corresponding rotational members increases and power loss increases. Grooves, in which seal rings are arranged, need high accuracy because the seal rings contact the grooves to seal the oil. Therefore, certain surfaces contacted by the seals need to be hardened to minimize wear. These actions increase manufacturing time and cost. Therefore it is desirable to decrease the number of such dynamic seals in an automatic transaxle.

In the gear train of U.S. Pat. No. 5,106,352, there are two input torque delivery paths. Output from the torque converter drives a planetary gear set on one side, and the output from the torque converter is decelerated through a reduction planetary gear on an opposite side. There is need there for many seal rings because the connections among the hydraulic paths that apply hydraulic pressure from the transmission case to the hydraulic servos are complicated and the hydraulic paths pass many times between rotating members.

Generally, hydraulic pressure is applied to a hydraulic servo of each clutch from a front end wall portion and a rear end wall portion of the transmission case. Arranging a center support on the middle portion of the transmission case and applying hydraulic pressure from the center support simplify the hydraulic paths. In this case, the number of seal rings is reduced. However, in such a case, the center support is located in the shift mechanism. The number of parts is increased and costs increase. Therefore, it is desirable to simplify the hydraulic paths.

SUMMARY OF THE INVENTION

In one of its embodiments, a multiple speed transmission according to this invention includes a first engagement device surrounding an axis, a second engagement device substantially aligned axially with, and located radially external of the first engagement device, and a third engagement device substantially aligned radially with, and located radially external of the second engagement device.

In another of its embodiments the present invention includes a first engagement device surrounding an axis, a second engagement device substantially aligned axially with, and located radially external of the first engagement device, a support having first and second axially spaced fluid outlets, a hub surrounding the support, having a fluid passage hydraulically connecting the first and second engagement devices with the first and second outlets, and first, second and third seals, each seal located at an axial side of the first outlet and second outlet, for hydraulically sealing the first outlet and second outlet.

It is an advantage of this invention that the axial length of an automatic transmission having multiple gear stages is reduced, and its efficiency is improved by reducing the number of seal rings that cause sliding resistance.

The strategic integration and arrangement of the elements of the gear train minimize the axial length of the gear train. This advantage is primarily accomplished by the structure of the integrated hydraulic servo of both the first clutch and third clutch. The hydraulic paths are arranged in the thick center wall portion of the integrated hub axially aligned with each other. The thick center wall portion, thin center wall portion, and cylindrical outer wall portion of the integrated hub form the cylinder for the piston. In addition, the hydraulic servo of the second brake is located radially outside and directly on top of the hydraulic servo of the second clutch. This reduces the axial length of the gear train.

The frictional member of the first brake is arranged radially outside directly on top of the frictional member of the third clutch. The frictional member of the third clutch is arranged radially outside and directly on top of the frictional member of the first clutch. The frictional member of the first clutch is arranged radially outside and directly on top of the speed reduction planetary gear. This arrangement further reduces the axial length of the gear train. In addition, the hydraulic servo of the first brake is arranged radially outside and directly on top of the integrated hydraulic servo of both the first clutch and third clutch. This also reduces the axial length of the gear train.

The number of seal rings in the gear train is minimized. By minimizing the number of seal rings, which cause sliding resistance, the overall power transmission efficiency is improved. Three seal rings, arranged on the outside diameter of the rear support, seal the hydraulic paths between the rear support and the integrated hub of the integrated hydraulic servo of both the first clutch and the third clutch. Two seal rings, located on the outside diameter of the rear side portion of the stator support, seal the hydraulic path between the stator support and the hydraulic servo of the second clutch.

The hydraulic paths for applying lubrication oil have been arranged so that seal rings are not required. Therefore, a total of five seal rings are used in the gear train to prevent leakage of hydraulic paths that apply hydraulic pressure to servos of clutches and brakes and that apply lubrication oil.

DESCRIPTION OF THE PREFERRED EMBODIMENT (S)

Figure 1:
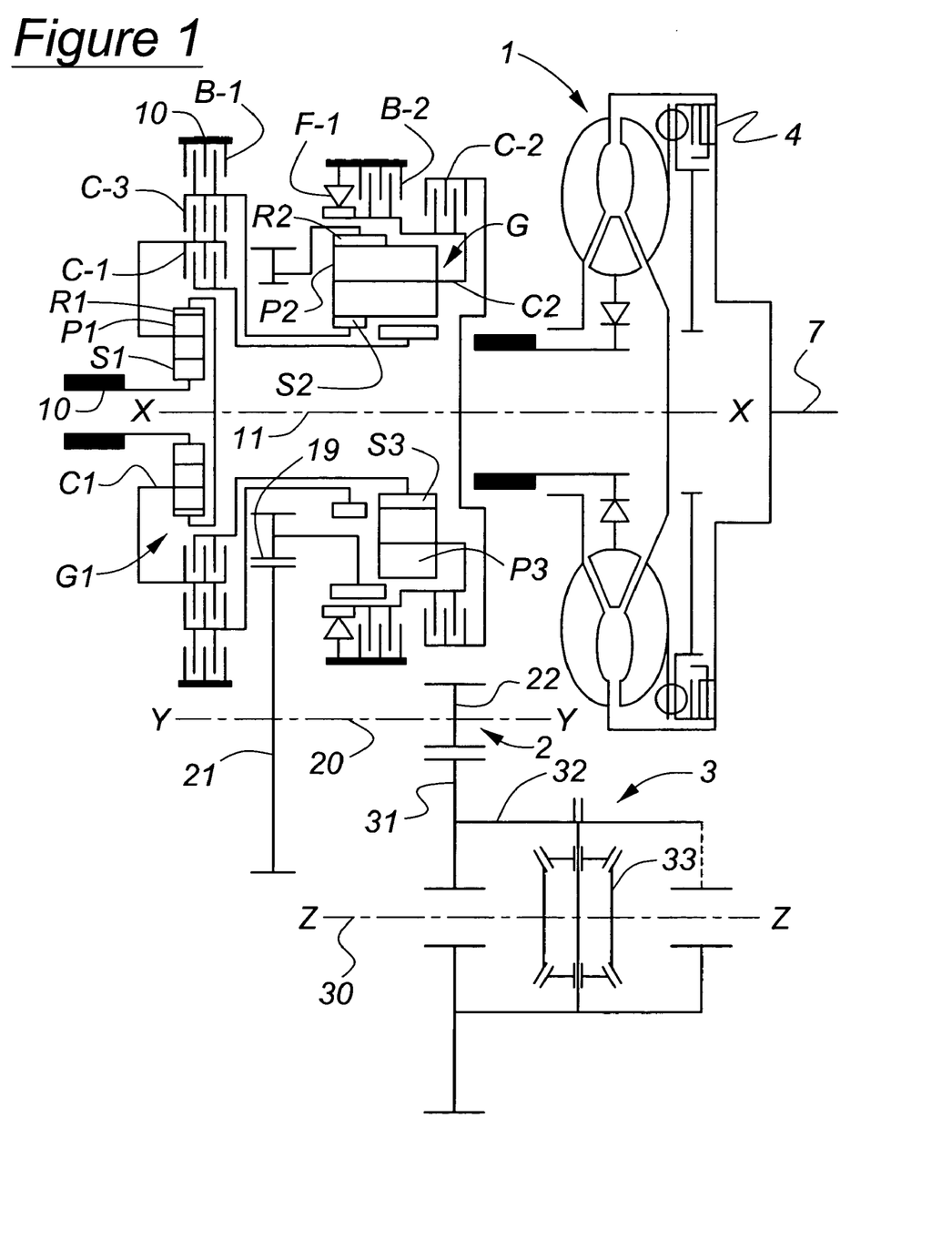
FIG. 1 is a schematic diagram of a kinematic arrangement for a transaxle to which the present invention can be applied, various axes being shown in a common plane.
Figure 2:
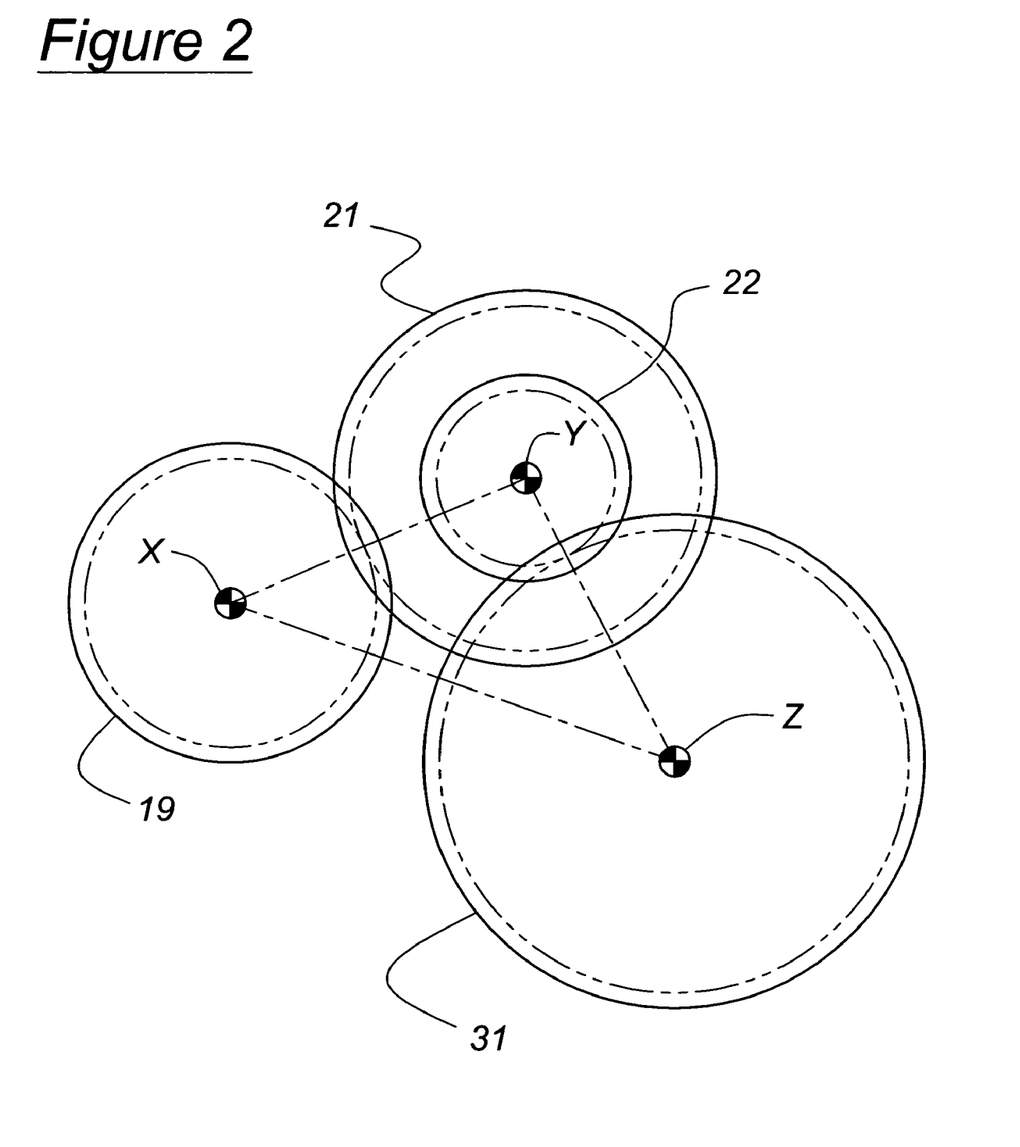
FIG. 2 illustrates the relationship among the axes when the transaxle is viewed along the axes from the left-hand side.

Turning first to FIGS. 1 and 2, an automatic transaxle according to the present invention is arranged on three mutually parallel axes including a main axis X, a counter axis Y, and a differential axis Z. A torque converter 1, having a lock-up clutch 4, multiplies torque produced by an engine and transmitted on engine shaft 7. A torque converter turbine wheel is driveably connected to an input shaft 11, which is arranged on the main axis X.

The automatic transaxle for producing multiple speed ratios includes a planetary gear set G having inputs driven with a decelerated speed and a non-decelerated speed compared to the speed of the engine shaft. A speed reduction planetary gear G1 is arranged axially parallel with the planetary gear set G. Input shaft 11 extends through the inner side of the planetary gear set G. A first clutch C-1 and a third clutch C-3 engage and disengage to connect selectively and individually the input shaft 11 through the reduction planetary gear G1 to two separate decelerated rotation input elements S2 and S3 of the planetary gear set G. A second clutch C-2 is able to engage and disengage to connect selectively the input shaft 11 to a non-decelerated rotation input element C2 of the planetary gear set G.

The shift mechanism of the automatic transmission, which comprises the planetary gear set G, the reduction planetary gear G1, three clutches C-1, C-2, C-3, two brakes B-1, B-2, and a one-way clutch F-1, is located radially outside of the input shaft 11 on the main axis X.

The planetary gear set G, a Ravigneaux type gear set, includes a relatively large diameter sun gear S2, a small sun gear S3 having a smaller diameter, a carrier C2 supporting a long planet pinion P2 and a short planet pinion P3, which pinions are engaged mutually and with a ring gear R2. The long pinion P2 engages with the large sun gear S2 and the ring gear R2. The short pinion P3 engages with the small sun gear S3. The large sun gear S2 and the small sun gear S3 are the decelerated rotation input elements. The carrier C2 is the non-decelerated rotation input element. The ring gear R2 is the output element.

The small sun gear S3 is connected through the first clutch C-1 and the reduction planetary gear G1 to the input shaft 11. The large sun gear S2 is connected through the third clutch C-3 and the reduction planetary gear G1 to the input shaft 11, and it is driveably engagable with the transmission case 10 through operation of the first brake B-1. The carrier C2 is connected through the second clutch C-2 to the input shaft 11 and can be engaged with the transmission case 10 by the second brake B-2. The one-way clutch F-1 is arranged as an engagement element in parallel with the brake B-2. The one-way clutch F-1, which is automatically released according to the engagement of the brake B-2, is used to prevent a complicated hydraulic control for a clutch-to-clutch shift between the brake B-2 and the brake B-1 and for simplifying the disengagement hydraulic control of the brake B-2. The ring gear R2 is connected to the counter drive gear 19.

A reduction planetary gear set G1 includes a sun gear S1, a carrier C1 supporting a short planet pinion P1, and a ring gear R1. The sun gear S1 is fixed on the transmission case 10. The carrier C1 is the output element and is connected through clutch C-1 and clutch C-3 to the sun gears S2, S3 of the planetary gear set G. The ring gear, which is connected to the input shaft 11, is the input element.

A counter gear 2, which includes a counter driven gear 21 with a large diameter, a differential drive pinion gear 22 with a small diameter, and a counter shaft 20, is arranged on the counter axis Y. The counter driven gear 21 is fixed on the counter shaft 20 and engages the counter drive gear 19, which is the output element on the main axis X. The differential drive pinion gear 22 is integrated with the counter shaft 20 and is the output element on the counter axis Y. The output torque from the main axis X is reduced, inverted, and transmitted to a differential unit 3 so that final speed ratios are achieved, and the rotational direction of the input shaft 11 is accommodated with the rotational direction of the output from the differential unit 3. The differential unit 3, which includes a differential ring gear 31, differential case 32, and differential side gears 33, is arranged on the differential axis Z. The differential ring gear 31 is fixed to the differential case 32 and engages the differential drive pinion gear 22 of the counter gear 2. Differential rotation of the differential gear 33 located in the differential case 32 is then output to left and right output shafts 30, which transmit the final wheel driving torque.

Figure 3:
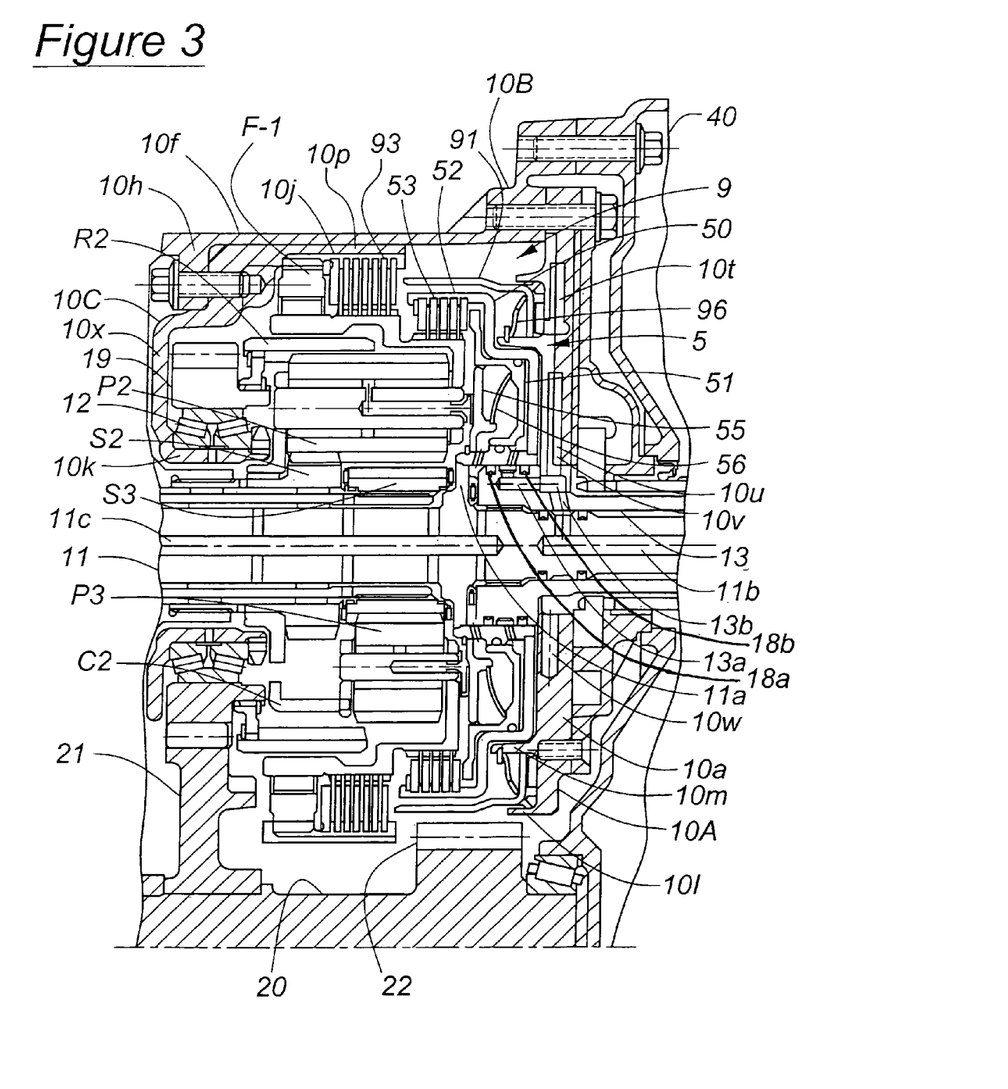
FIG. 3 is a cross section showing the right-hand portion of an assembly of the transaxle of FIG. 1.
Figure 4:
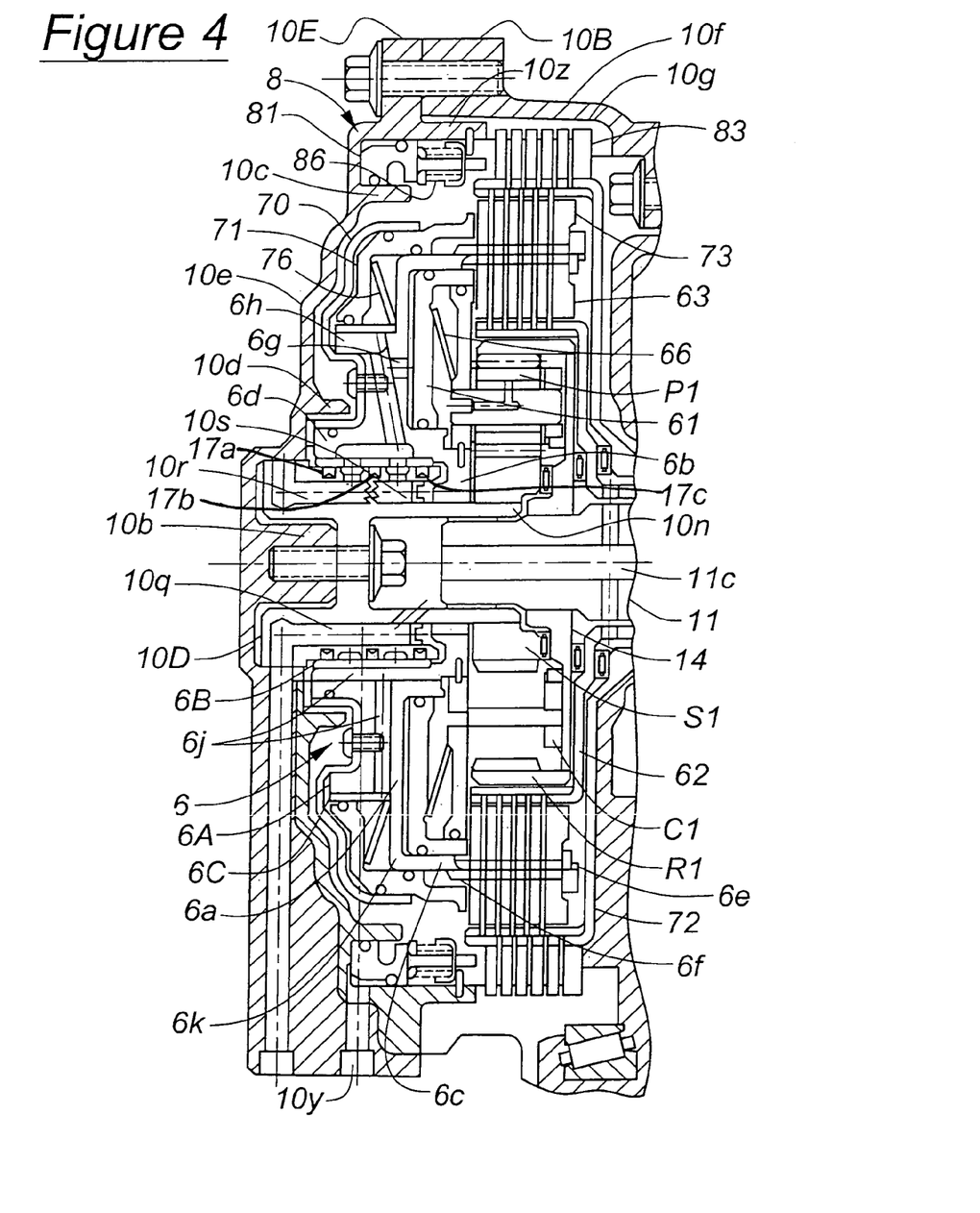
FIG. 4 is a cross section showing the left-hand portion of an assembly of the transaxle of FIG. 1.

Referring now to FIGS. 3 and 4, the first clutch C-1 and the third clutch C-3 are pressurized and vented through a common integrated hydraulic servo 6 to alternately engage and disengage separate frictional elements 63 and 73. The second clutch C-2 is pressurized and vented through a hydraulic servo 5 to alternately engage and disengage frictional elements 53. The first brake B-1 is pressurized through a hydraulic servo 8 to engage frictional elements 83. The second brake B-2 is pressurized through a hydraulic servo 9 to engage frictional elements 93.

The transmission case 10 includes a case mainframe 10B that is open at the front side and rear side, a front support 10A, a rear cover 10E, a center support 10C, and a rear support 10D. The front support 10A is fixed to the case mainframe 10B with a bolt to close the front side opening of the case mainframe 10B. The rear cover 10E is fixed to the case mainframe 10B with a bolt to close the rear side opening of the case mainframe 10B. The center support 10C is fixed to the case mainframe 10B with a bolt. The rear support 10D is fixed to the rear cover 10E with a bolt.

The case mainframe 10B comprises a surrounding wall portion 10f that tapers inward from the front side and rear side, and a partial inner flange 10h located in the axially rear half portion of the case mainframe 10B for supporting the center support 10C. A spline 10g is formed from the rear side opening of the case mainframe 10B and extends on the inner surface of the surrounding wall portion 10f to the partial inner flange 10h.

The front support 10A comprises a thick wall portion 10a that supports a pump body 16 fixed to it on the front side, a cylindrical outer wall portion 10l that extends toward the rear side from the thick wall portion 10a and forms the outer wall of a cylinder of the hydraulic servo 9 of the second brake B-2, a cylindrical inner wall portion 10m that extends toward the rear side from the thick wall portion 10a and forms the inner wall of a cylinder of the hydraulic servo 9 of the second brake B-2, a hydraulic path 10t through which hydraulic pressure is applied to and vented from the hydraulic servo 9 of the second brake B-2, a hydraulic path 10u through which a hydraulic pressure is applied to and vented from the hydraulic servo 5 of the second clutch C-2, a hydraulic path 10v through which hydraulic pressure is applied and vented to engage and disengage the torque converter lock-up clutch 4, and a hydraulic path 10w for applying oil to the impeller of the torque converter 1.

The rear cover 10E includes a rear end wall portion 10e; a cylindrical outer wall portion 10z that extends toward the front side from the rear end wall portion 10e, which provides a pilot for the rear cover 10E and a snap ring groove to secure the return spring 86 of the hydraulic servo 8 of the first brake B-1; a cylindrical center wall portion 10c that extends toward the front side from the rear end wall portion 10e and forms the inner wall of a cylinder of the hydraulic servo 8 of the first brake B-1; a cylindrical inner wall portion 10d that extends toward the front side from the rear end wall portion 10e and contains a bushing to support the integrated hydraulic servo 6 of both the first clutch C-1 and the third clutch C-3; and a rear boss portion 10b that extends toward the front side from the rear end wall portion 10e to provide thread engagement for fixing the rear support 10D to the rear cover 10E.

The center support 10C includes a center wall portion 10x, a cylindrical inner wall portion 10k that extends toward the front side from the center wall portion 10x to support the counter drive gear 19, and a cylindrical outer wall portion 10p that extends toward the front side from the center wall portion 10x. A spline 10j is formed on the inner surface of the cylindrical outer wall portion 10p of the center support 10C.

The rear support 10D includes a sleeve portion 10n that extends toward the front side to fix the sun gear S1 and contains a bushing to support the integrated hydraulic servo 6 of both the first clutch C-1 and the third clutch C-3; a hydraulic path 10q for applying lubrication oil; and hydraulic paths 10r and 10s through which hydraulic pressure is applied to and vented from the integrated hydraulic servo 6 of both the first clutch C-1 and the third clutch C-3.

The stator support 13 is arranged radially outside the front portion of the input shaft 11 and is pressed into the thick wall portion 10a of the front support 10A. The stator support 13 includes an extended shaft portion; a rear side portion; a hydraulic path 13a, through which hydraulic pressure is applied to and vented from the hydraulic servo 5 of the second clutch C-2; and a hydraulic path 13b, through which hydraulic pressure is applied and vented to engage and disengage the torque converter lock-up clutch 4. The extended shaft portion of the stator support 13 connects a stator of the torque converter through one-way clutch F-1 to the front support 10A.

The input shaft 11 is formed with a hydraulic path 11b, through which hydraulic pressure is applied and vented to engage and disengage the torque converter lock-up clutch; a hydraulic path 11c for applying lubrication oil; and a flange 11a formed on the radial outer surface of the input shaft 11 at the axially center portion. The input shaft 11 is supported in the radial direction at the front side by the stator support 13 through a bushing located toward the front side from flange 11a. The input shaft 11 is supported in the radial direction at the rear side by the sleeve portion 10n of the rear support 10D through a bushing. The input shaft 11 is axially supported at the front side by the stator support 13 through a thrust bearing located between the flange 11a and the stator support 13. The input shaft 11 is axially supported at the rear side by the rear support 10D through the thrust path of the gear train.

The hydraulic servo 5 of the second clutch C-2 is arranged radially outside the rear side portion of the stator support 13 to the rear side of the front support 10A and is connected to the flange 11a of the input shaft 11. The hydraulic servo 5 includes a cylinder 50 integrated with a drum 52; a sliding piston 51 moveable within the cylinder 50; a balance plate 55 for canceling centrifugal pressure; and a return spring 56. Hydraulic pressure is applied to and vented from the hydraulic servo 5 through a hydraulic path 13a formed in the rear side portion of the stator support 13.

The hydraulic servo 9 of the second brake B-2 is arranged radially outside and directly on top of the hydraulic servo 5 of the second clutch C-2. The hydraulic servo 9 includes a cylinder integrated into the rear side of the thick wall portion 10a of the front support 10A; a sliding piston 91 inserted into the cylinder; and a return spring 96. Hydraulic pressure is applied to and vented from hydraulic servo 9 through a hydraulic path 10t formed in the thick wall portion 10a of the front support 10A.

The planetary gear set G is arranged radially outside the center portion of the input shaft 11 and to the rear of the hydraulic servo 5 of the second clutch C-2. The smaller diameter sun gear S3 is arranged in the radially inward, front side portion of the planetary gear set G. The larger diameter sun gear S2 is arranged in the radially inward, rear side portion of the planetary gear set G. The carrier C2 comprises a housing and shafts for supporting the long planet pinions P2 and the short planet pinions P3. A cylindrical outer wall portion of the housing is arranged in the extreme radially outward portion of the planetary gear set G and extends from the front side of the planetary gear set G toward the rear side. The cylindrical outer wall portion of the housing provides a hub for the frictional member 53 of the second clutch C-2, a hub for the frictional member 93 of the second brake B-2, and an inner race for the one-way clutch F-1. The ring gear R2 is arranged in the radially outward, rear side portion of the planetary gear set G, radially inward from the rear side of the cylindrical outer wall portion of the housing of the carrier C2. The small sun gear S3 is supported in the radial direction by the front side of the extended shaft portion of the drum 62 of the first clutch C-1, which is supported by the input shaft 11 through bushings at the front side and rear side. The large sun gear S2 is supported in the radial direction by the extended shaft portion of the drum 62 of the first clutch C-1 through bushings at the gear portion and the extended shaft portion. The carrier C2 is supported in the radial direction by the extended shaft portion of the large sun gear S2 through a bushing at the rear side. The ring gear R2 is supported by and connected to the counter drive gear 19 through a separate flange member by two spline connections. The small sun gear S3 is connected to the extended shaft portion of the drum 62 of the first clutch C-1 by a spline. The extended shaft portion of the large sun gear S2 is connected to the extended shaft portion of the drum 72 of the third clutch C-3 by a spline.

The counter drive gear 19 is arranged radially outside the rear half portion of the input shaft 11 to the rear of the planetary gear set G. The counter drive gear 19 is supported in the radial and axial direction by the cylindrical inner wall portion 10k of the center support 10C through a bearing 12.

The center wall portion 10x of the center support 10C is arranged to the rear of the counter drive gear 19. The center wall portion of the drum 72 of the third clutch C-3 is arranged to the rear of the center wall portion 10x of the center support 10C. The center wall portion of the drum 62 of the first clutch C-1 is arranged to the rear of the center wall portion of the drum 72 of the third clutch C-3. The power transmission member 14 is arranged to the rear side of the center wall portion of the drum 62 of the first clutch C-1.

Turning particularly to FIG. 4, the reduction planetary gear G1 is arranged radially outside the rear portion of the input shaft 11 to the rear side of the power transmission member 14. The sun gear S1 is arranged in the radially inward portion of the reduction planetary gear G1 and is fixed with a spline engagement to the sleeve portion 10n of the rear support 10D. The ring gear R1 is arranged in the radially outward portion of the reduction planetary gear G1 and is connected to the power transmission member 14 that is engaged with the input shaft 11 by a spline engagement. The carrier C1 comprises a housing and shafts for supporting the pinions P1. The rear wall portion of the housing functions as a balance plate for canceling a centrifugal pressure and provides a groove for a seal at its outside diameter, a spline for transmitting rotation to the integrated hub 6A of the integrated hydraulic servo 6 of both the first clutch C-1 and the third clutch C-3 at its inside diameter, and a groove for a snap ring at its inside diameter.

The integrated hydraulic servo 6 of both the first clutch C-1 and the third clutch C-3 is arranged radially outside the rear support 10D to the rear of the reduction planetary gear G1. The integrated hydraulic servo 6 includes an integrated hub 6A, an inner sleeve 6B, an outer sleeve 6C, a cylinder 70, sliding pistons 61 and 71, and return springs 66 and 76. The integrated hub 6A includes a thick center wall portion 6a; a thin center wall portion 6k, which is located radially outside the thick center wall portion 6a; a front wall portion 6b; a cylindrical outer wall portion 6c, which extends toward the front side from the thick center wall portion 6a; a cylindrical inner wall portion 6d, which extends toward the rear side from the thick center wall portion 6a; a hydraulic path 6g, through which hydraulic pressure is applied to and vented from the portion of the integrated hydraulic servo 6 that operates the first clutch C-1; a hydraulic path 6h, through which hydraulic pressure is applied to and vented from the portion of the integrated hydraulic servo 6 that operates the third clutch C-3; and a hydraulic path 6j, which applies lubrication oil to the balance area of the portion of the integrated hydraulic servo 6 that operates the first clutch C-1 and the portion of the integrated hydraulic servo 6 that operates the third clutch C-3.

A spline 6e is formed on the inner surface of the cylindrical outer wall portion 6c and a spline 6f is formed on the outer surface of the cylindrical outer wall portion 6c. The front wall portion 6b provides a groove for a snap ring to axially support the carrier C1 of the reduction planetary gear G1 and is connected to the carrier C1 of the reduction planetary gear G1 by a spline engagement. The cylindrical inner wall portion 6d provides a pilot for the cylinder 70 and a groove for a seal to prevent leakage when hydraulic pressure is applied to and vented from the portion of the integrated hydraulic servo 6 that operates the third clutch C-3.

The thick center wall portion 6a, the thin center wall portion 6k, and the cylindrical outer wall portion 6c together form the cylinder for the piston 61. The piston 61 is located radially outside the front wall portion 6b to the rear of the reduction planetary gear G1. The rear wall portion of the housing of carrier C1 functions as a balance plate for canceling centrifugal pressure.

The piston 71 is located radially outside the thick center wall portion 6a to the rear of the thin center wall portion 6k, which functions as a balance plate for canceling centrifugal pressure. The cylinder 70 is arranged to the rear side of the integrated hub 6A and is fixed to the integrated hub 6A with a bolt.

The inner sleeve 6B is pressed onto the radially inward portion of the thick center wall portion 6a to the rear side of the front wall portion 6b. The inner sleeve 6B directs oil into the integrated hub 6A and provides a radially inner wall for the first, second and fourth hydraulic paths 6g, 6h, and 6j. The outer sleeve 6C is pressed onto the radially outward portion of the thick center wall portion 6a at the rear side of the thin center wall portion 6k. The outer sleeve 6C seals the radially outward end of the hydraulic path 6g and provides a radially outer wall for the hydraulic path 6h.

The integrated hydraulic servo 6 is supported in the radial direction at the front side by the sleeve portion 10n of the rear support 10D through a bushing. The integrated hydraulic servo 6 is supported in the radial direction at the rear side by the cylindrical inner wall portion 10d of the rear cover 10E through a bushing.

The hydraulic servo 8 of the first brake B-1 is located radially outside and directly on top of the integrated hydraulic servo 6 of both the first clutch C-1 and the third clutch C-3. The hydraulic servo 8 includes a cylinder integrated into the front side of the rear end wall portion 10e of the rear cover 10E, a sliding piston 81 located in the cylinder, and a return spring 86. Hydraulic pressure is applied to and vented from the hydraulic servo 8 through a third hydraulic path 10y formed in the rear cover 10E.

Turning particularly now to FIG. 3, the frictional member 53 of the second clutch C-2 is located radially outside the front portion of the planetary gear set G. The frictional member 53 comprises friction discs and separator plates. The friction discs are engaged with the carrier C2 by a spline engagement at the radially inner surface. The separator plates are engaged with the drum 52 by a spline engagement at the radially outer surface. The frictional member 53 transmits torque from the drum 52 to the carrier C2 when hydraulic pressure is applied to the hydraulic servo 5 to move piston 51 leftward to compress the frictional member 53 against a snap ring supported in the end of the drum 52.

The frictional member 93 of the second brake B-2 is located radially outside the center portion of the planetary gear set G. The frictional member 53 comprises friction discs and separator plates. The friction discs are engaged with the carrier C2 by a spline engagement at the radially inner surface. The separator plates are engaged with the spline 10j of the center support 10C at the radially outer surface. The frictional member 93 stops rotation of the carrier C2 when hydraulic pressure is applied to the hydraulic servo 9 to move piston 91 leftward to compress the frictional member 93 against a snap ring supported in the radial inner surface of the outer cylindrical wall 10p of the center support 10C.

A one-way clutch F-1 is located radially outside the rear portion of the planetary gear set G to the rear of frictional member 93. The outer race of the one-way clutch F-1 is engaged with the spline 10j of the center support 10C at the radially outer surface.

Turning particularly now to FIG. 4, the frictional member 63 of the first clutch C-1 is located radially outside and directly on top of the reduction planetary gear G1. The frictional member 63 includes friction discs and separator plates. The friction discs are engaged with the drum 62 by a spline engagement at the radially inner surface. The separator plates are engaged with the spline 6e of the cylindrical outer wall portion 6c of the integrated hub 6A at the radially outer surface. The frictional member 63 transmits torque from the integrated hub 6A to the drum 62 when hydraulic pressure is applied to the integrated hydraulic servo 6 to move piston 61 rightward to compress the frictional member 63 against a snap ring supported in the radially inner surface of the cylindrical outer wall portion 6c of the integrated hub 6A.

The frictional member 73 of the third clutch C-3 is located radially outside and directly on top of the frictional member 63 of the first clutch C-1. The frictional member 73 comprises friction discs and separator plates. The friction discs are engaged with the drum 72 by a spline engagement at the radially outer surface. The separator plates are engaged with the spline 6f of the cylindrical outer wall portion 6c of the integrated hub 6A at the radially inner surface. The frictional member 73 transmits torque from the integrated hub 6A to the drum 72 when hydraulic pressure is applied to the integrated hydraulic servo 6 to move piston 71 rightward to compress the frictional member 73 against a stop on the radially outer surface of the cylindrical outer wall portion 6c of the integrated hub 6A.

The frictional member 83 of the first brake B-1 is located radially outside and directly on top of the frictional member 73 of the third clutch C-3. The frictional member 83 comprises friction discs and separator plates. The friction discs are engaged with the drum 72 by a spline engagement at the radially inner surface. The separator plates are engaged with the spline 10g of the case mainframe 10B at the radially outer surface. The frictional member 83 stops rotation of the drum 72 when hydraulic pressure is applied to the hydraulic servo 8 to move piston 81 rightward to compress the frictional member 83 against a stop in the surrounding wall portion 10f of the case mainframe 10B.

The counter driven gear 21, which engages the counter drive gear 19, is arranged radially outside the rear side portion of the counter shaft 20. The differential drive pinion gear 22, which is integrated with the counter shaft 20, is arranged on the front side portion of the counter shaft, axially aligned with the hydraulic servo 5 of the second clutch C-2. The counter shaft 20 is supported in the radial and axial directions at the rear side by the case mainframe 10B through a bearing. The counter shaft 20 is supported in the radial and axial directions at the front side by the converter housing 40 through a bearing.

Figure 5:
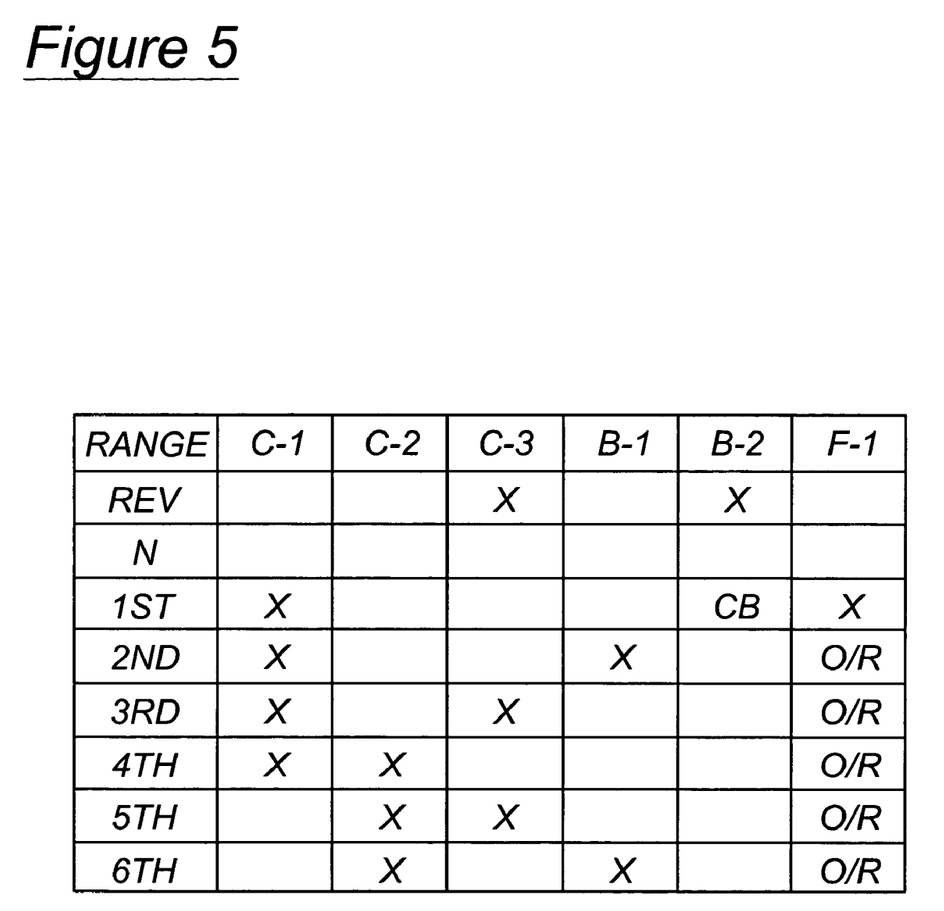
FIG. 5 is a schedule showing the engaged and disengaged states of various clutches and brakes and the corresponding operating gear ranges of the transaxle.

FIG. 5 illustrates the gear ranges, which are established by the engagement and disengagement of selected clutch and brake elements. In FIG. 5, the symbol O/R indicates that one-way clutch F-1 is overrunning and not producing a drive connection between its inner race and outer race. The first gear range is established by engagement of the first clutch C-1 and automatic engagement of the one-way clutch F-1. The rotational speed of the input shaft 11, decelerated through the reduction planetary gear G1, is input to the small sun gear S3 of the planetary gear set G through the first clutch C-1. The carrier C2, which is engaged with the center support 10C by engagement of the one-way clutch F-1, functions as a reaction element that further decelerates the rotational speed to the ring gear R2. Therefore, the rotational speed of the ring gear R2 is output to the counter drive gear 19 as the rotational speed decelerated from the input shaft 11, further decelerated by a reaction element, in this case the carrier C2.

The second gear range is established by engagement of the first clutch C-1 and the first brake B-1. The rotational speed of the input shaft 11, decelerated through the reduction planetary gear G1, is input to the small sun gear S3 of the planetary gear set G through the first clutch C-1. The large sun gear S2, which is engaged with the case mainframe 10B by engagement of the first brake B-1, functions as a reaction element that further decelerates, although not as much as the first gear range, the rotational speed input to the ring gear R2. Therefore, the rotational speed of the ring gear R2 is output to the counter drive gear 19 as the rotational speed decelerated from the input shaft 11, further decelerated, although not as much as the first gear range, by a reaction element, in this case the large sun gear S2.

The third gear range is established by concurrent engagement of the first clutch C-1 and third clutch C-3. The rotational speed of the input shaft 11, decelerated through the reduction planetary gear G1, is concurrently input to the small sun gear S3 and the large sun gear S2 of the planetary gear set G through the first clutch C-1 and the third clutch C-3. The planetary gear set G is then in a directly connected state. Therefore, the rotational speed of the ring gear R2 is output to the counter drive gear 19 as the rotational speed decelerated from the input shaft 11.

The fourth gear range is established by concurrent engagement of the first clutch C-1 and second clutch C-2. The rotational speed of the input shaft 11, decelerated through the reduction planetary gear G1, is input to the small sun gear S3 of the planetary gear set G on one side through the first clutch C-1. The rotational speed of the input shaft 11 that is not decelerated is input to the carrier C2 of the planetary gear set G on the other side through the second clutch C-2. The resultant rotational speed of the two input rotations barely decelerates the rotational speed input to the ring gear R2. Therefore, the rotational speed of the ring gear R2 is output to the counter drive gear 19 as the rotational speed slightly decelerated from the input shaft 11.

The fifth gear range is established by concurrent engagement of the second clutch C-2 and the third clutch C-3. The rotational speed of the input shaft 11, decelerated through the reduction planetary gear G1, is input to the large sun gear S2 of the planetary gear set G on one side through the first clutch C-3. The rotational speed of the input shaft 11 that is not decelerated is input to the carrier C2 of the planetary gear set G on the other side through the second clutch C-2. The resultant rotational speed of the two input rotations barely accelerates the rotational speed input to the ring gear R2. Therefore, the rotational speed of the ring gear R2 is output to the counter drive gear 19 as the rotational speed slightly accelerated from the input shaft 11.

The sixth gear range is established by engagement of the second clutch C-2 and the first brake B-1. The rotational speed of the input shaft 11 that is not decelerated is input to the carrier C2 of the planetary gear set G through the second clutch C-2. The large sun gear S2, which is engaged with the case mainframe 10B by engagement of the first brake B-1, functions as a reaction element that accelerates the rotational speed input to the ring gear R2. Therefore, the rotational speed of the ring gear R2 is output to the counter drive gear 19 as the rotational speed from the input shaft 11 accelerated by a reaction element, in this case the large sun gear S2.

The reverse gear range is established by engagement of the third clutch C-3 and the second brake B-2. The rotational speed of the input shaft 11 is decelerated through the reduction planetary gear G1 and is input to the large sun gear S2 of the planetary gear set G through the third clutch C-3. The carrier C2, which is engaged with the center support 10C by engagement of the second brake B-2, functions as a reaction element that further decelerates, although not as much as the first gear range, the rotational speed input to the ring gear R2 and reverses its rotational direction. Therefore, the rotational speed of the ring gear R2 is output in a reversed rotational direction to the counter drive gear 19 as the rotational speed decelerated from the input shaft 11, further decelerated, although not as much as the first gear range, by a reaction element, in this case the carrier C2.

During an engine coasting condition wherein the wheels drive the engine, the second brake B-2 is engaged to brake the engine because the direction of the reaction force input to the carrier C2 of the planetary gear set G is reversed from its direction during an engine driving state.

The integration and arrangement of the elements of the gear train minimize the axial length of the gear train. This is primarily accomplished by the structure of the integrated hydraulic servo 6 of both the first clutch C-1 and the third clutch C-3. The hydraulic paths 6$g$, 6$h$, and 6$j$ are arranged in the thick center wall portion 6$a$ of the integrated hub 6A axially aligned with each other. The thick center wall portion 6$a$, the thin center wall portion 6$k$, and the cylindrical outer wall portion 6$c$ of the integrated hub 6A function together as the cylinder for the piston 61. The thin center wall portion 6$k$ of the integrated hub 6A functions as a balance plate for canceling centrifugal pressure. Furthermore, the rear wall portion of the housing of the carrier C1 of the reduction planetary gear G1 functions as a balance plate for canceling centrifugal pressure. In addition, the hydraulic servo 9 of the second brake B-2 is located radially outside and directly on top of the hydraulic servo 5 of the second clutch C-2. This further helps reduce the axial length of the gear train.

In addition, the frictional member 83 of the first brake B-1 is located radially outside and directly on top of the frictional member 73 of the third clutch C-3, the frictional member 73 of the third clutch C-3 is located radially outside and directly on top of the frictional member 63 of the first clutch C-1, and the frictional member 63 of the first clutch C-1 is located radially outside and directly on top of the reduction planetary gear G1. This arrangement reduces the axial length of the gear train. In addition, the hydraulic servo 8 of the first brake B-1 is located radially outside and directly on top of the integrated hydraulic servo 6 of both the first clutch C-1 and the third clutch C-3. This arrangement additionally reduces the axial length of the gear train.

The number of seal rings in the gear train, which prevent leakage of the hydraulic paths that both apply hydraulic pressure to hydraulic servos of clutches and carry lubrication oil, is reduced. By minimizing the number of seal rings, which cause sliding resistance, the overall power transmission efficiency is improved. First, second, and third seal rings, 17$g$, 17$b$, and 17$c$, arranged on the outside diameter of the rear support 10D, seal the hydraulic paths 10$r$ and 10$s$ between the rear support 10D and the integrated hub 6A of the integrated hydraulic servo 6 of both the first clutch C-1 and the third clutch C-3. Fourth and fifth seal rings, 18$a$ and 18$b$, arranged on the outside diameter of the rear side portion of the stator support 13, seal the hydraulic path 13$a$ between the stator support 13 and the hydraulic servo 5 of the second clutch C-2. The hydraulic paths for carrying lubrication oil have been arranged so that seal rings are not required. Therefore, a total of five seal rings are used in the gear train to prevent leakage of hydraulic paths that apply hydraulic pressure to hydraulic servos of clutches and that carry lubrication oil.

The frictional member 83 of the first brake B-1 comprises friction discs and separator plates. These are easier to control hydraulically during a shift event than a frictional brake band. Thus an improvement in the shift quality characteristics of the transmission is realized, specifically in the first to second gear range shift event where the step ratio change between gears is greatest. By arranging the hydraulic servo 8 and the frictional member 83 of the first brake B-1 at the rear side of the gear train, their position does not detrimentally effect the function of the transmission, as would be the case if they were arranged in the front side of the gear train where the diameter of the differential ring gear 31 would be compromised.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A multiple speed transmission having components arranged on an axis, comprising:

a first engagement device surrounding the axis;

a second engagement device substantially aligned radially with, and located radially external of the first engagement device;

a support including first and second axially spaced fluid outlets;

a hub surrounding the support, including a fluid passage hydraulically connecting the first and second engagement devices with the first and second outlets; and first, second and third seals for hydraulically sealing the first outlet and the second outlet, the first seal located at a first axial side of the first outlet, the second seal located between the first and second outlets at a second side of the first outlet opposite the location of the first seal, the third seal located at an axial side of the second outlet opposite the location of the second seal.

2. The transmission of claim 1, further comprising:

a third engagement device surrounding the axis and spaced radially from the first engagement device;

a second support having a third fluid outlet; and a fourth seal located at an axial side of the third outlet and a fifth seal located at an axial side of the third outlet opposite the location of the fourth seal, for hydraulically sealing the third outlet.

3. The transmission of claim 1, further comprising:

an outer sleeve contacting the hub and forming a wall at a radially outer end of the fluid passage.

* * * * *